(12) United States Patent
Cherekdjian et al.

(10) Patent No.: US 12,112,859 B2
(45) Date of Patent: Oct. 8, 2024

(54) ION PRODUCTION SYSTEM WITH FIBROUS LATTICE FOR ION COLLECTION

(71) Applicant: SHINE Technologies, LLC, Janesville, WI (US)

(72) Inventors: Sarko Cherekdjian, Janesville, WI (US); Rich Sisson, Beloit, WI (US)

(73) Assignee: SHINE Technologies, LLC, Janesville, WI (US)

( * ) Notice: Subject to any disclaimer, the term of this patent is extended or adjusted under 35 U.S.C. 154(b) by 160 days.

(21) Appl. No.: 17/957,310

(22) Filed: Sep. 30, 2022

(65) Prior Publication Data

US 2023/0109221 A1 Apr. 6, 2023

Related U.S. Application Data

(60) Provisional application No. 63/251,397, filed on Oct. 1, 2021.

(51) Int. Cl.
*G21G 1/00* (2006.01)

(52) U.S. Cl.
CPC ..... *G21G 1/001* (2013.01); *G21G 2001/0094* (2013.01)

(58) Field of Classification Search
CPC ...................................... G21G 1/001
USPC ........................................ 423/429
See application file for complete search history.

(56) References Cited

U.S. PATENT DOCUMENTS

| | | |
|---|---|---|
| 3,296,481 A | 1/1967 | Peters |
| 3,825,790 A | 7/1974 | Bacal et al. |
| 4,587,432 A | 5/1986 | Aitken |
| 4,616,157 A | 10/1986 | Naylor et al. |
| 4,847,504 A | 7/1989 | Aitken |
| 6,356,026 B1 | 3/2002 | Murto |
| 6,501,078 B1 | 12/2002 | Ryding et al. |
| 6,755,150 B2 | 6/2004 | Lai et al. |
| 7,107,929 B2 | 9/2006 | Horsky et al. |
| 7,227,160 B1 | 6/2007 | Vanderberg et al. |
| 7,363,876 B2 | 4/2008 | Lai et al. |
| 7,435,971 B2 | 10/2008 | Vanderberg et al. |
| 7,462,843 B2 | 12/2008 | Chen et al. |
| 7,819,981 B2 | 10/2010 | Dimeo et al. |
| 7,834,554 B2 | 11/2010 | Horsky |
| 7,960,709 B2 | 6/2011 | Horsky et al. |
| 8,049,192 B2 | 11/2011 | Bassom et al. |

(Continued)

FOREIGN PATENT DOCUMENTS

| | | |
|---|---|---|
| CN | 100392147 | 6/2008 |
| CN | 101634012 | 1/2010 |

(Continued)

OTHER PUBLICATIONS

International Search Report & Written Opinion for PCT/US22/45398; mailed Jan. 20, 2023; 27 pages.

(Continued)

*Primary Examiner* — Melissa S Swain
(74) *Attorney, Agent, or Firm* — Casimir Jones, S.C.; Brian F. Bradley

(57) ABSTRACT

A method that includes accelerating a plurality of ytterbium ions toward a lattice of carbon fibers; wherein at least a portion of the plurality of ytterbium ions is a plurality of ytterbium-176 ions. The method further includes isolating the plurality of ytterbium-176 ions from the plurality of ytterbium ions; and capturing the plurality of ytterbium-176 ions in the lattice of carbon fibers.

19 Claims, 6 Drawing Sheets

(56) References Cited

U.S. PATENT DOCUMENTS

| | | |
|---|---|---|
| 8,154,210 B2 | 4/2012 | Horsky et al. |
| 8,263,941 B2 | 9/2012 | Benveniste et al. |
| 8,368,309 B2 | 2/2013 | Horsky et al. |
| 8,669,517 B2 | 3/2014 | Hamby et al. |
| 9,142,379 B2 | 9/2015 | Koo et al. |
| 9,401,260 B2 | 7/2016 | Lane |
| 9,431,214 B2 | 8/2016 | Matsushita et al. |
| 9,496,117 B2 | 11/2016 | Schaller |
| 9,711,318 B2 | 7/2017 | White |
| 10,037,883 B2 | 7/2018 | Chebi et al. |
| 10,453,667 B2 | 10/2019 | Green et al. |
| 10,504,682 B2 | 12/2019 | Chang et al. |
| 11,017,974 B2 | 5/2021 | Hahto et al. |
| 11,205,560 B2 | 12/2021 | Potkins et al. |
| 2001/0012483 A1 | 8/2001 | Kono et al. |
| 2006/0249671 A1 | 11/2006 | Karpetsky |
| 2008/0048107 A1 | 2/2008 | McEwen |
| 2009/0014667 A1 | 1/2009 | Hahto et al. |
| 2009/0090862 A1 | 4/2009 | Kawana et al. |
| 2010/0024841 A1 | 2/2010 | Koo et al. |
| 2010/0107980 A1 | 5/2010 | Horsky et al. |
| 2012/0235053 A1 | 9/2012 | White |
| 2013/0084408 A1 | 4/2013 | Nakao et al. |
| 2015/0011096 A1 | 1/2015 | Chandrasekharan et al. |
| 2016/0230269 A1 | 8/2016 | Raj et al. |
| 2017/0204271 A1 | 7/2017 | Harutyunyan et al. |
| 2020/0024755 A1 | 1/2020 | Kutchcoskie et al. |
| 2021/0272716 A1 | 9/2021 | Park, Jr. et al. |

FOREIGN PATENT DOCUMENTS

| | | |
|---|---|---|
| CN | 108411273 | 8/2018 |
| EP | 0135366 B1 | 11/1990 |
| JP | 61-032940 | 2/1986 |
| JP | 01-095455 | 4/1989 |
| JP | 2004-234929 | 8/2004 |
| KR | 100712494 B1 | 5/2007 |
| RU | 2158170 | 10/2000 |
| WO | WO 2007/067296 | 6/2007 |
| WO | WO 2015/094382 | 6/2015 |
| WO | WO 2020/214197 | 10/2020 |

OTHER PUBLICATIONS

International Search Report and Written Opinion issued for PCT/US2022/029153 dated Sep. 21, 2022, 8 pages.

Lin. "Kinetic energy and spatial distribution of ions in high irradiance laser ionization source" 1184-1185. Journal of Analytical Atomic Spectrometry. Web. 2011 [retrieved on Aug. 2, 2022] retrieved from the Internet: URL: https://www.researchgate.net/publication/255752970_Kinetic_energy_and_spatial_distribution_of_ions_in_high_irradiance_laser_ionization_source; Entire Document.

Farley et al. "Freeman and Bernas Ion Sources", The Physics and Technology of Ion Sources, Aug. 25, 2004, pp. 133-161.

International Search Report and Written Opinion issued for PCT/US2021/062174 mailed Mar. 31, 2022, 11 pages.

'Structure of Ion Source', Shimadzu.com Feb. 1, 2022 (Feb. 1, 2022) [retrieved from the internet on Aug. 6, 2024 at <https://www.ssi.shimadzu.com/products/gas-chromatography-mass-spectrometry/structure_of_ionsource.html> ].

International Search Report and Written Opinion issued for PCT/US2021/045855 mailed Nov. 30, 2021, 8 pages.

ION PRODUCTION SYSTEM WITH FIBROUS LATTICE FOR ION COLLECTION

CROSS-REFERENCE TO RELATED APPLICATIONS

This application claims the benefit of U.S. Provisional Application No. 63/251,397 filed on Oct. 1, 2021, which is incorporated herein by reference in its entirety.

TECHNOLOGY

The present disclosure relates generally to the field of heavy metal ion production, for example production of heavy metal ions used in health care applications. More specifically, the present disclosure relates to improving the efficiency of collecting and constituting ions accelerated out of an ion source at a high extraction energy.

BACKGROUND

Previous technologies that involve ion beams are typically intended to provide high-energy collisions between the ion beam and a substrate material, in order to create changes to the substrate material. The ions themselves in such systems are not efficiently retained in the substrate material, and they may be sputtered, sublimated, or scattered away. Such systems and methods do not provide for high-efficiency collection of the ions themselves. In contrast, one goal of the present application is collection of the ions of the ion beam as a constituted material which can be collected, stored, transported, used, etc., for example in health care applications.

SUMMARY

One implementation of the present disclosure is a method. The method includes providing a lattice of carbon fibers, accelerating ions toward the lattice of carbon fibers, and capturing the ions in the lattice of carbon fibers. The method may also include burning the lattice of carbon fibers to obtain a residue comprising the ions.

The ions may be ytterbium ions. In some embodiments, the ions include ytterbium-176 ions and the method also includes isolating the ytterbium-176 ions from other isotopes before capturing the ions in the lattice of carbon fibers.

In some embodiments, accelerating the ions toward the lattice of carbon fibers includes providing the ions with energies greater than 100V. Capturing the ions in the lattice of carbon fibers may include decelerating the ions by deflecting the ions off of a plurality of the carbon fibers of lattice of carbon fibers.

In some embodiments, the method includes increasing an area of the lattice of carbon fibers that captures the ions by operating an actuator to rotate or translate the lattice of carbon fibers. The method may also include providing multiple layers of a fibrous carbon material. Providing the lattice of carbon fibers may include arranging the carbon fibers in a plurality of directions.

Another implementation of the present disclosure is an ion production system. The ion production system may include an ion source configured to produce ions, a target comprising a fibrous lattice, and an electrode positioned between the ion source and the target substrate and configured to accelerate the ions toward the target substrate so that the ions are incident on the fibrous lattice. The fibrous lattice is configured to capture the ions. The ions may be ytterbium ions, for example including ytterbium-176 ions.

The fibrous lattice may include a plurality of carbon fibers arranged in a plurality of directions. The target may include a plurality of layers of the fibrous lattice. The fibrous lattice may include graphite or carbon, and may be configured to burn. The fibrous lattice may leave a residue comprising the ions after burning of the fibrous lattice.

In some embodiments, the electrode provides the ions with energies greater than 100V. In some embodiments, the target includes a mount configured to releaseably secure the fibrous lattice in position relative to the mount. The ion production system may include an actuator operable to rotate the target.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
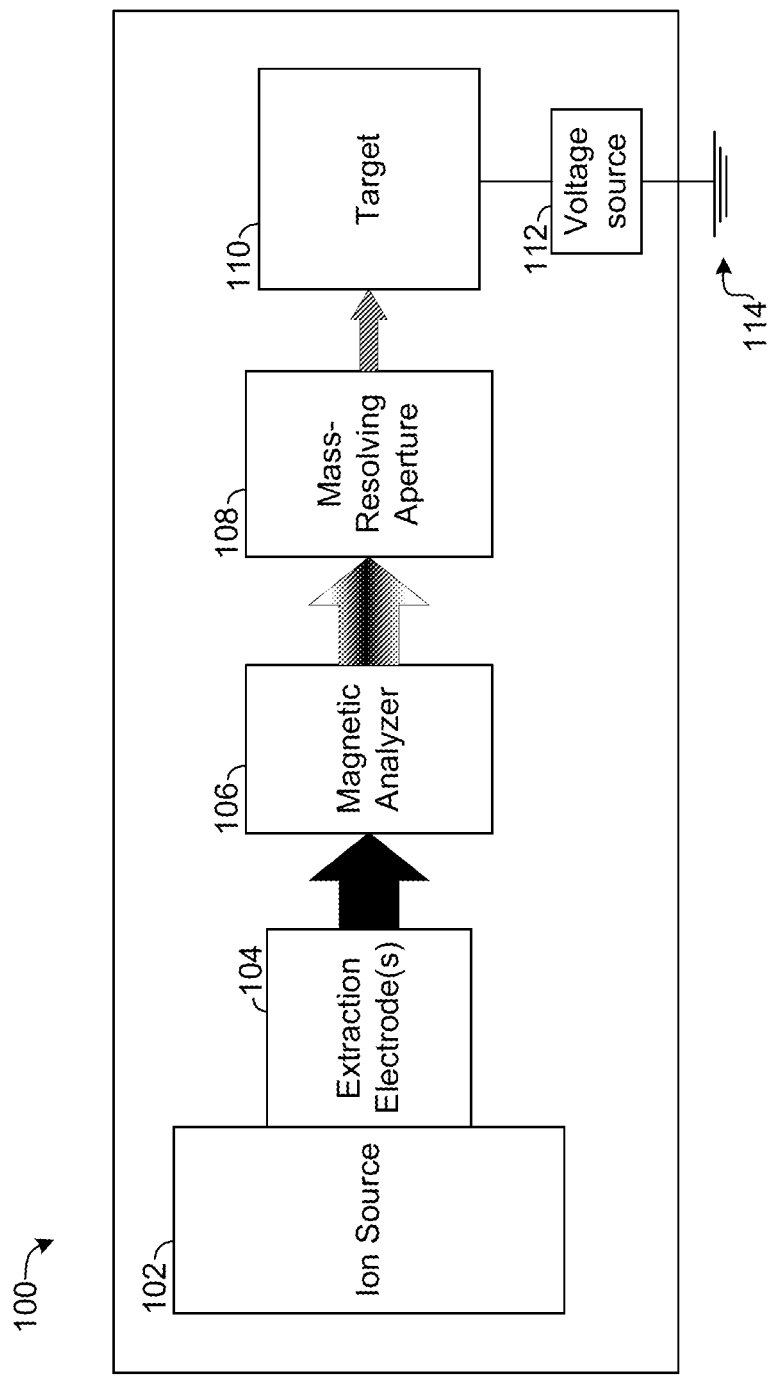
FIG. 1 is a schematic diagram of an ion production system, according to an illustrative embodiment.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, systems and methods relating to an ion production system, for example a heavy metal ion production system, are shown, according to various example embodiments. In particular, the figures generally show systems and methods relating to high-efficiency collection of ions (e.g., heavy metal ions such as ytterbium ions including ytterbium-176 ions) at a target of the ion production system, such that the ions are reconstituted as a material which can then be collected, stored, transported, used, etc. for various applications (e.g., a material having a high concentration of ytterbium-176 or other desired isotope).

As detailed below, the ions are generated in an ion source and extracted out of the ion source as an ion beam having a high extraction energy, for example between 20 kV and 80 kV (e.g., between 40 kV and 60 kV) (noting that ion kinetic energy is often expressed in volts in this context, with one volt equaling one joule per coulomb; in other conventions these values may be expressed in keV). The ion beam may be passed through a magnetic analyzer, which uses a magnetic field to sort ions by momentum (or, if the charges of all the generated ions are the same, by atomic mass), and a mass-resolving aperture which is arranged relative to the beam and the magnetic analyzer to primarily pass desired ions (e.g., ions of a desired isotope) while blocking other ions from passing through the aperture. An ion beam having only the desired ions or a high percentage of the desired ions is thus passed through the aperture. Thus, the mass-resolving aperture isolates the desired ions or a high percentage of the desired ions. The target (target substrate, substrate, etc.) is positioned such that the beam of desired ions is incident on the target.

The approaches described herein provide for a high rate of ion sticking to the target and low sputtering rates at the target, thus increasing the percentage of the ions that are constituted as a neutral material (e.g., of the desired isotope) and decreasing the percentage of the ions which are lost. The overall efficiency (e.g., power and resource consumption per unit of material produced) of the whole ion production system are thus improved. Build-up of the ions on other, undesired surfaces of the ion production system (which may otherwise result from scattering of ions) is also minimized or prevented, thereby reducing downtime and maintenance of the ion production system. Additionally, the approaches herein can reduce heat transfer to the target substrate (heat load on the target, thermal energy load on the target) and thus reduce or eliminate a temperature management issue that may otherwise be caused by high-energy collisions at the target.

As detailed below, some of the advantages herein are achieved in part and/or in some embodiments, by holding the target at a voltage having the same polarity as the ions and having a magnitude slightly below the potential of the ion beam. The voltage of the target (and the electric field created by that voltage) causes a reduction in energy of the ion beam as the ion beam approaches the target. For example, the voltage of the target may be selected to offset (at least partially) the energy added to the ion beam provided by the extraction electrodes, such that the energy of the ions is reduced to a thermal energy as the ions reach the target. In such cases, both electronic stopping (i.e., interactions between the ions and the target interactions between electrons of the ions and electrons of the target substrate) and nuclear stopping (i.e., interactions between the nuclei of the ions and nuclei of the target substrate) of the ions at the target are reduce to zero, or near-zero, levels. By reducing these interactions via the potential of the target, the ions are caused to stick and form as a film at the target rather than colliding with the target at high energies and sputtering or scattering away.

The systems and methods described herein also provide a material of the target which is well-adapted to efficiently capture ions incident thereon and to be easily reduced to a residue having a high concentration of a desired isotope/atom (i.e., from the ion beam). In particular, as described in detail below, a fibrous lattice, for example a lattice, felt, mesh, etc. of carbon fibers (e.g., graphite fibers) can be positioned so that the ion beam is incident thereon. The fibrous lattice captures the ions and can be easily burned (or subjected to some other reaction) when in the presence of oxygen to leave a residue having a high concentration of a desired isotope, for example. The fibrous lattice can be rotated or translated relative to the beam during operation of the ion production system to increase the collection capacity of the target before operation needs to be paused to harvest the desired isotope from the target. The various concepts described below thus individually and collectively provide for highly efficient collection of a desired isotope.

Referring now to FIG. 1, a block diagram of an ion production system 100 is shown, according to an illustrative embodiment. The ion production system 100 includes an ion source 102, extraction electrode(s) 104, a magnetic analyzer 106, a mass-resolving aperture 108, a target 110, and a voltage source 112 connected to ground 114 and to the target 110. The ion source 102, the extraction electrode(s) 104, the magnetic analyzer 106, the mass-resolving aperture 108, and the target 110 are arranged sequentially such that ions are generated at the ion source 102 and sequentially pass the extraction electrode(s) 104, magnetic analyzer 106, and mass-resolving aperture 108 before reaching the target 110. As detailed below, the ion production system 100 is configured to provide efficient collection of desired ions at the target 110 as a constituted, neutral material which can be removed, stored, transported, etc., and eventually used for some application, for example a healthcare application.

The ion source 102 is configured to produce ions. For example, the ion source 102 may be configured as a Bernas or Freeman ion source, which includes a filament operable to emit electrons which ionize a gas provided into the ion source 102, for example a heavy metal gas such as a ytterbium vapor. Other metals (Lu, Tc, etc. may also be used). Interactions between the electrons and the gas ionize the gas to produce ions. In some embodiments, the ion source 102 produces positive ions (i.e., "cations," ions having a positive polarity). In other embodiments, the ion source produces negative ions (i.e., "anions," ions having a negative polarity). The ion source 102 includes an outlet slit or aperture so that the ions can be extracted from the ion source 102. In some embodiments, the ion source 102 includes auxiliary heaters to protect elements of the ion source 102 and to improve uniformity of the ions for extraction from the ion source 102, for example as described in detail in U.S. Provisional Patent Application No. 63/122,699, filed Dec. 8, 2020, the entire disclosure of which is incorporated by reference herein.

The extraction electrode(s) 104 includes one or more electrodes that are configured and operated to provide an electric field that extracts the ions from the ion source 102. Because the ions have an electric charge of a first polarity (positive or negative in different embodiments), a voltage of the opposite polarity at the extraction electrode(s) 104 will pull the ions out of the ion source as an ion beam. The extraction electrode(s) 104 may include one or more electrodes to accelerate the ion beam, decelerate the ion beam, shape the beam, aim the beam, etc. By providing an electric field that accelerates the ion beam out of the ion source 102, the extraction electrode(s) 104 provide the ion beam with an extraction energy of the same or similar magnitude as a voltage of the extraction electrode(s) 104. For example, an electrode at a voltage of 55 kV can provide the ion beam with an extraction energy of 55 kV (noting that ion kinetic energy is often expressed in volts in this context, with one volt equaling one joule per coulomb) as the ion beam pass the extraction electrode(s) 104.

An ion beam having a high extraction energy is thus provided as an output of the extraction electrode(s) 104. In various embodiments, the high extraction energy can be in a range between 20 kV and 80 kV, for example between 40 kV and 60 kV (e.g., 55 kV). In such embodiments, the voltage applied at the extraction electrode(s) 104 can be selected to provide the ion beam with the desired extraction energy for a particular scenario.

In the example of FIG. 1, the ion beam passes from the extraction electrodes 104 to the magnetic analyzer 106. In other embodiments, the magnetic analyzer 106 is omitted. The magnetic analyzer 106 is configured to provide a magnetic field that creates magnetic forces on the ion beam. The magnetic force on each ion may be approximately equal, but the ion beam may include ions of different isotopes, such that the masses of the ions vary. The magnetic force provided by the magnetic analyzer 106 may result in a separation of ions by mass. Thus, after passing through the magnetic analyzer 106, different areas of a transverse cross-section of the ion beam may include different isotopes, i.e., ions of different mass.

In FIG. 1, the ion beam is illustrated to pass from the magnetic analyzer 106 to the mass-resolving aperture 108, and the mass-resolving aperture 108 is configured to block an undesired subset of the ions from passing through the mass-resolving aperture 108, while allowing desired ions to pass through the mass-resolving aperture 108. Thus, the mass-resolving aperture 108 isolates the desired ions or a high percentage of the desired ions. In particular, ions allowed through the mass-resolving aperture 108 are primarily ions of a desired isotope (or two desired isotopes), while ions of one or more other isotopes are intercepted by the mass-resolving aperture 108. This is achieved by positioning the mass-resolving aperture 108 relative to the magnetic analyzer 106 to take advantage of the separation of isotopes by mass achieved by the magnetic analyzer 106. Various geometric arrangements are possible in various embodiments. Thus, in examples including the magnetic analyzer 106 and the mass-resolving aperture 108, the ion beam that reaches the target 110 includes a high percentage of a desired isotope or desired isotopes, with a low percentage of contamination by ions of different isotopes.

The ion beam from the mass-resolving aperture 108 is incident on target 110. The target 110 is configured to receive and collect the ions of the ion beam. The target 110 can include a substrate material suitable for receiving and retaining the ions, including as a film on a surface of the target 110 and/or embedded in a lattice structure of the target 110. For example, the substrate material of the target 110 may have a crystal structure. As another example, the substrate material of the target 110 may include a carbon fiber material (e.g., a carbon fiber cloth). The material(s) of the target 110 are also selected such that the target 110 is capable of being held at a substantially-constant voltage as ions are collected on, implanted in, or other received at the target 110. The material(s) of the target 110 may be selected to help cause sticking of the ions to or in the target 110. The target 110 may be removable and replaceable in the ion production system 100 to facilitate harvesting of the ionic material that builds up on the target 110 during operation of the ion source 102.

Figure 3:
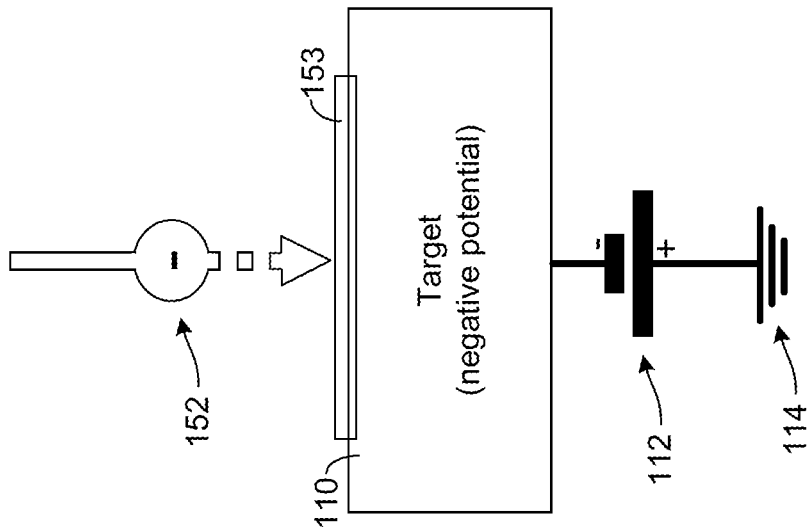
FIG. 3 is a schematic diagram of a target and voltage source of the ion production system in an embodiment involving negative ions, according to an illustrative embodiment.
Figure 2:
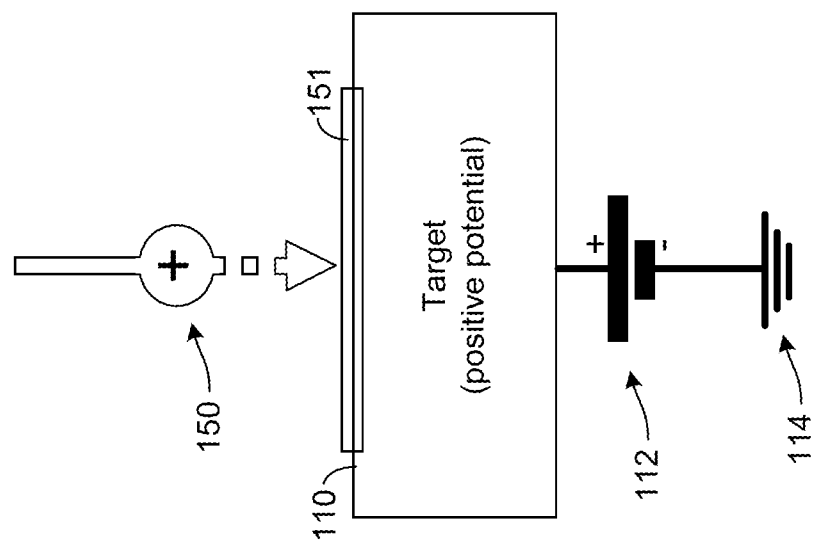
FIG. 2 is a schematic diagram of a target and voltage source of the ion production system in an embodiment involving positive ions, according to an illustrative embodiment.

The target 110 is shown as being coupled to a voltage source 112, which is connected between the target 110 and ground 114. Other elements of the ion production system 100 also include suitable electronics elements, power sources, etc. to enable operation thereof. The voltage source 112 is configured to hold (put, establish, maintain, etc.) the target 110 at a voltage (referred to herein as the target voltage) which has the same polarity of the ion beam. For example, as illustrated in FIGS. 2-3 and discussed below, a positive voltage is provided to the target 110 by the voltage source 112 in scenarios where positive ions are generated by the ion source, while a negative voltage is provided to the target 110 by the voltage source 112 in scenarios where negative ions are generated by the ion source. In other embodiments, the target 110 is connected directly to ground such that the target 110 is not biased as in the examples of FIGS. 2-3.

The target voltage is preferably less than the extraction energy of the ion beam, such that the ion beam is able to reach the target without being forced in the opposite direction by the target voltage, while being high enough to reduce the energy of ion beam far enough to minimize both electronic and nuclear stopping of the ion beam at the target 110 (thereby minimizing scattering or sputtering that would otherwise be caused by high-energy collisions between the ions and the target 110). For example, the target voltage may be less than the extraction energy by an amount corresponding to a thermal energy of the ions, such that the energy of the ions is reduced to thermal energy just as the ions reach the target 110. In various embodiments, the target voltage is both less than the extraction energy and greater than 95% of the extraction energy, for example greater than 99% of the extraction energy (while also being less than the extraction energy). In some examples, the target voltage is approximately 100 V less than the extraction energy such that the ion beam has an energy of approximately 100 V when the ion beam reaches the target (e.g., extraction energy minus target voltage equals approximately 100V). In one example, the extraction energy is 55 kV and the target voltage is 54.9 kV.

In some embodiments, the voltage source 112 and the target 110 are configured so that the voltage of the target 110 stays substantially constant throughout operation of the ion production system 100 and as ions collect on the target 110 (e.g., as a film on the target 110, embedded in the target 110) and are constituted into a neutral material (e.g., of the desired isotope(s)). In some cases, to facilitate removal of the constituted ionized material from the target 110, the target 110 can be removable from the ion production system 100. In some such cases, the voltage source 112 is controlled to gradually reduce the target voltage toward zero to enable the target 110 to be disconnected from the voltage source 112 without disrupting the ionized material collected thereon. In some embodiments, the target 110 (or a portion thereof) is removed for use in transport and further processing of the ionized material, and replaced with a new target 110 (or new portion thereof) for use in subsequent operation of the ion production system 100. In other embodiments, the ionized material can be removed from the target 110 and collected in a receptacle (or other collection and retention device) such that the target 110 can be reused in a subsequent operation of the ion production system 100 to collect more ions.

Referring now to FIG. 2, a schematic illustration of the target 110 and voltage source 112 of the ion production system 100 in an embodiment involving positive ion beam 150 is shown, according to an example embodiment. FIG. 2 shows a positive ion beam 150 (i.e., a beam of positively-charged ions) aimed towards the target 110 and incident on the target 110.

Because the positive ion beam 150 has a positive polarity, the voltage of the target 110 is also provided with a positive polarity. FIG. 2 illustrates that the target 110 is connected to a positive terminal of the voltage source 112, with the negative terminal of the voltage source 112 connected to ground 114. The voltage source 112 holds the target 110 at a positive potential, i.e., an electrical potential of the same polarity as the positive ion beam 150.

The positive potential of the target 110 provides an electric field that resists movement of the ion beam 150 toward the target 110. The ion beam 150 must move across this electric field to reach the target 110. As it does so, kinetic energy of the ion beam 150 is converted into electric potential of the ions in the electric field created by the positive potential of the target 110. This may be thought of as being analogous to the ions rolling "uphill" to reach the target 110. As discussed above, the target voltage is selected and maintained such that the positive ion beam 150 reaches a low energy, for example a thermal energy, just as positive ions reach the target 110. Reduced to thermal energy, the positive ion beam 150 does not have extra kinetic energy that would cause it to move away from the target 110 or cause sputtering or scattering, and, thus, the ions of the positive ion beam 150 stick at the target 110, for example forming as the positive ion film 151 as shown in FIG. 2.

Referring now to FIG. 3, a schematic illustration of the target 110 and voltage source 112 of the ion production system 100 in an embodiment involving negative ion beam 152 is shown, according to an example embodiment. FIG. 2 shows a negative ion beam 152 (i.e., a beam of negatively-charged ions) aimed towards the target 110 and incident on the target 110.

Because the negative ion beam 152 has a negative polarity, the voltage of the target 110 is also provided with a negative polarity. FIG. 3 illustrates that the target 110 is connected to a negative terminal of the voltage source 112, with the positive terminal of the voltage source 112 connected to ground 114. The voltage source 112 holds the target 110 at a negative potential, i.e., an electrical potential of the same polarity as the negative ion beam 152.

The negative potential of the target 110 provides an electric field which resists movement of the ion beam 152 toward the target 110. The ion beam 152 must move across this electric field to reach the target 110. As it does so, kinetic energy of the ion beam 152 is converted into electric potential of the ions in the electric field created by the negative potential of the target 110. This may be thought of as being analogous to the ions rolling "uphill" to reach the target 110. As discussed above, the target voltage is selected and maintained such that the negative ion beam 152 reaches a low energy, for example a thermal energy, just as negative ions reach the target 110. Reduced to thermal energy, the negative ion beam 152 does not have extra kinetic energy that would cause it to move away from the target 110 or cause sputtering or scattering, and, thus, the ions of the negative ion beam 152 stick at the target 110, for example forming as the negative ion film 153 shown in FIG. 3.

The ion production system 100 is thereby configured for highly efficient production and collection of ions as a constituted ionized material. By setting the target 110 at the target voltage as described above, a high percentage of the ions incident on the target 110 are caused to stick at the target 110, for example forming a film at the target 110. The efficiency of the ion production system 100 is thereby improved by providing collection of a high percentage of the desirable ions created by the ion source 102. Additionally, because material is sputtered or scattered away at a low or zero rate, it is also substantially prevented from building up on other, unwanted surfaces in the ion production system 100, thereby reducing downtime, cleaning, maintenance, etc. of the ion production system 100. Additionally, while electronic or nuclear stopping of high energy ions at the target (i.e., collisions between atoms) would cause the thermal energy of the target to increase greatly, the embodiments herein reduce the energy of the ions using the electric potential provided by the voltage source 112 and thereby avoid the build-up of thermal energy at the target.

Figure 4:
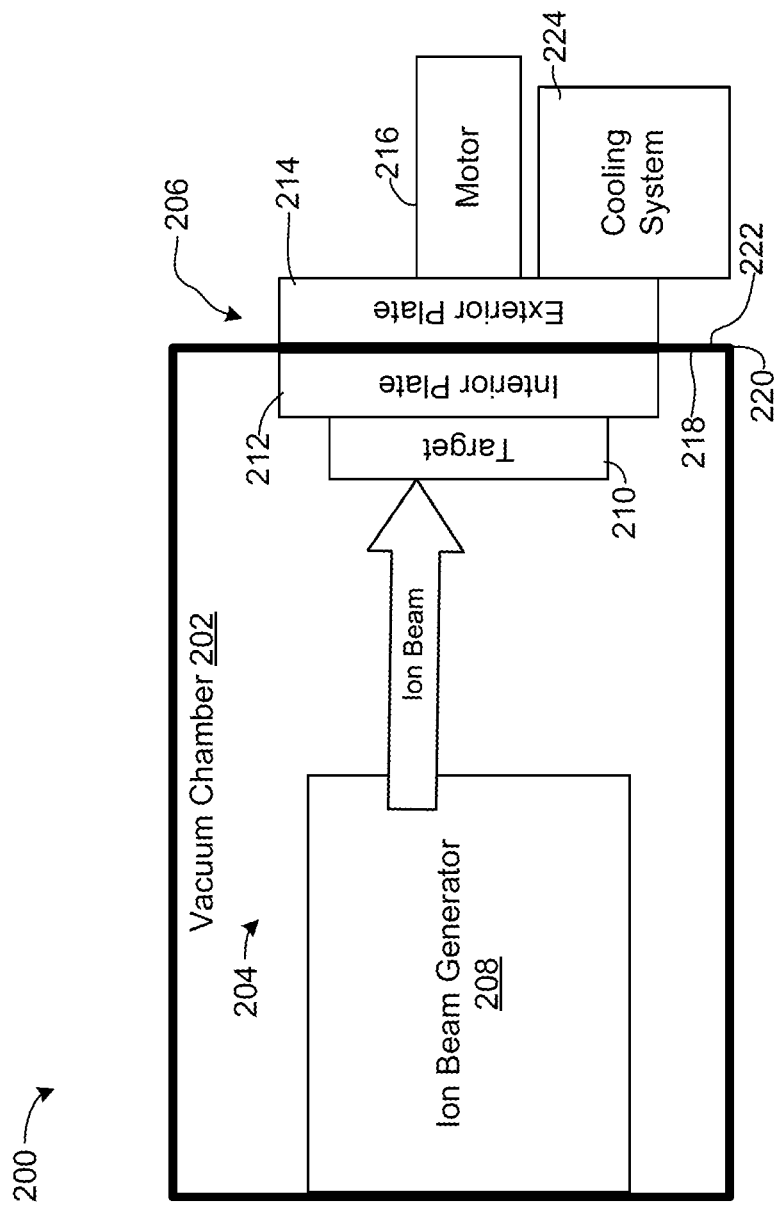
FIG. 4 is a block diagram of an ion production system having a magnetic rotation device, according to some embodiments.

Referring now to FIG. 4, a schematic diagram of an apparatus 200 that includes a vacuum chamber 202, an ion production system 204, and magnetic rotation device 206 is shown, according to some embodiments.

The ion production system 204 is shown as including an ion beam generator 208 and a target 210. The ion beam generator 208 is configured to generate an ion beam and direct the ion beam toward the target 210 so that the ion beam is incident on the target 210. The ion beam generator 208 can include the ion source 102, the extraction electrodes 104, the magnetic analyzer 106, and/or the mass-resolving aperture 108 of FIG. 1, for example. The target 210 may be configured the same as the target 110 of FIG. 1, for example.

As shown in FIG. 4, the target 210 is coupled to the magnetic rotation device 206. The magnetic rotation device 206 includes an interior plate (first plate) 212, and exterior plate (second plate) 214, and a motor 216. The interior plate 212 is inside (interior to, internal to, contained in) the vacuum chamber 202 and is positioned on an interior side 218 of a wall 220 of the vacuum chamber 202. The exterior plate 214 is outside (exterior to, external to, not contained in) the vacuum chamber 202 and is positioned on an exterior side 222 of the wall 220. The motor 216 is mechanically coupled to the exterior plate 214. The target 210 is mechanically coupled to the interior plate 212.

The motor 216 is operable to drive rotation of the exterior plate 214. The motor 216 may be an electric motor, for example a stepper motor, which transforms electricity into rotational movement. The motor 216 is coupled to the exterior plate 214 such that operation of the motor 216 exerts a torque on the exterior plate 214 that causes rotation of the exterior plate 214 about an axis of the exterior plate 214. A rotating drive shaft of the motor 216 can be aligned with the axis of the exterior plate 214 to directly transfer the torque to the exterior plate 214 to cause rotation of the exterior plate 214. The motor 216 can be controllable to rotate the exterior plate 214 at various speeds. In some embodiments, the motor 216 is operated to rotate the exterior plate 214 at a pace of approximately one rotation per minute.

The exterior plate 214 includes one or more magnets (e.g., permanent magnets) and the interior plate 212 also includes one or more magnets (e.g., permanent magnets) corresponding to the one or more magnets of the exterior plate 214. An example arrangement of magnets in the interior plate 212 and the exterior plate 214 is shown in FIGS. 3-6 and described with reference thereto. The magnets of the exterior plate 214 and the interior plate 212 are arranged such that an attractive force is exerted on the interior plate 212 by the exterior plate 214 and vice versa. For example, the one or more magnets of the exterior plate 214 may be arranged with a positive magnetic polarity facing the wall 220 while the one or more magnets of the interior plate 212 are arranged with a negative magnetic polarity facing the wall 220 (or vice versa), such that the magnets are attracted toward one another and a magnetic force pulls the interior plate 212 and the exterior plate 214 together. The magnets provide sufficiently strong magnetic fields to exert the attractive force across the wall 220 of the vacuum chamber 202. The wall 220 may be approximately half of an inch thick in some embodiments.

Due to the attractive magnetic force between the magnets of the exterior plate 214 and the interior plate 212, rotation of the exterior plate 214 by the motor 216 causes rotation of the interior plate 212. In the examples shown, the interior plate 212 rotates to match the rotation of the exterior plate 214 due to magnetic coupling therebetween. Rotational movement and torque (e.g., angular kinetic energy) is thereby communicated across the wall 220 of the vacuum chamber 202 without compromising the integrity of a hermetic seal of the vacuum chamber 202 (e.g., without requiring mechanical engagement between the interior plate 212 and the exterior plate 214 that may be difficult to hermetically seal). Because, as shown in FIG. 4, the target 210 is mounted on the interior plate 212, rotation of the interior plate 212 rotates the target 210. Although the examples herein refer to rotation, in other embodiments the motor 216 is arranged to translate the exterior plate 214 (e.g., in one or two dimensions) to thereby cause corresponding translation of the interior plate 212 and the target 210. Operation of the motor 216 thereby causes motion of the target 210, for example rotation of the target 210.

As illustrated in FIG. 4, the ion beam generator 208 directs the ion beam at the target 210 so that the ion beam is misaligned (offset, etc.) relative to an axis of rotation of the target 210. Accordingly, when the target 210 rotates by operation of the magnetic rotation device 206, the point or area at which the ion beam is incident on the target 210 changes. Rotation of the target 210 over time causes the ion beam to be incident on different portions of the target 210 over time, thereby increasing a total area of the target 210 that is exposed to the ion beam. Movement of the target 210 thereby allows a larger area of the target 210 to be exposed to the ion beam and to capture ions and/or isotopes from the ion beam. The target 210 can thus capture more material as compared to an embodiment with a static target 210, allowing for longer continuous operation of the apparatus 200 before the target is full (saturated, at capacity, etc.). Rotating the target can also help reduce temperature gradients across the target, which may be undesirable.

The magnetic rotation device 206 is also configured to provide heat transfer into or out of the vacuum chamber, for example to remove heat from the target 210 to manage the temperature thereof. As shown, the interior plate 212 and the exterior plate 214 are both positioned in contact with the wall 220 of the vacuum chamber 202. The interior plate 212 and the exterior plate 214 can include a material with high thermal conductivity (e.g., low resistance to heat flow therethrough), for example a metal such as steel. The wall 220 may be made of a similar material. The interior plate 212 and the exterior plate 214 are in thermal contact with one another via the wall 220. Such thermal contact is maintained by the attractive force between the magnets of the interior plate 212 and the exterior plate 214 which can force the interior plate 212 and the exterior plate 214 towards one another and into contact with the wall 220. The target 210 shown as positioned on the interior plate 212. A pathway for heat transfer is thereby provided from the target 210 to the exterior plate 214.

In the embodiment shown, the apparatus 200 also includes a cooling system 224 in thermal communication with the exterior plate 214. The cooling system 224 can include a refrigeration cycle (including a compressor, condenser, expansion valve, and evaporator, for example) configured to remove heat from the exterior plate 214. For example, the cooling system 224 may provide a chilled fluid through one or more coils or other heat exchanger in thermal contact with the exterior plate 214. Cooling of the exterior plate 214 increases the heat flow away from the target 210, which may be desirable in embodiments where collision of the ion beam with the target 210 provides thermal energy to the target 210. In other scenarios (e.g., other use cases for the magnetic rotation device 206), the cooling system 224 can include or be replaced with a heating system configured to provide thermal energy to the exterior plate 214 in order to transfer thermal energy (heat) into the vacuum chamber 202 via the interior plate 212.

Figure 5:
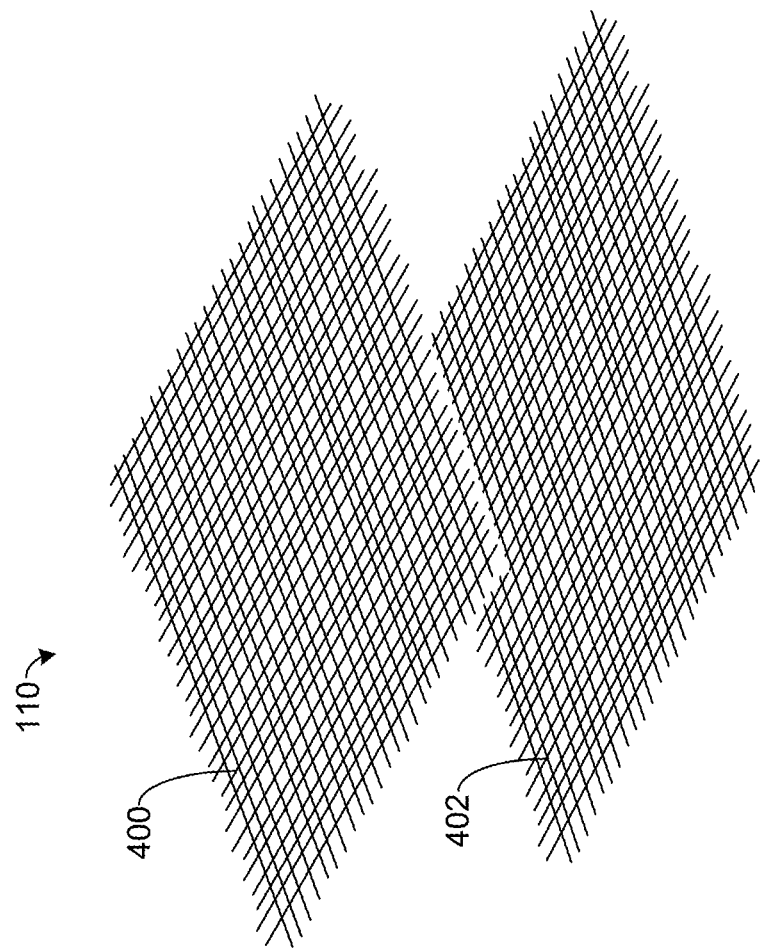
FIG. 5 is an exploded view of a fibrous lattice of a target of an ion production system, according to some embodiments.

Referring now to FIG. 5, an exploded view of the target 110 (or target 210) or a portion thereof (e.g., a fibrous lattice thereof) is shown, according to some embodiments. In the example of FIG. 5, the target 110 includes a first lattice 400 and a second lattice 402 which form the target 110 as a fibrous lattice. The first lattice 400 and the second lattice 402 may be stacked as layers to form the target 110. In other embodiments, other numbers of lattices (layers) are included in the target 110 (e.g., one, three, four, five, etc.). The fibrous lattice may be formed as a carbon felt or carbon foam in various embodiments.

The first lattice 400 includes a plurality of fibers arranged in a plurality of directions, shown as two orthogonal directions. The plurality of fibers may be woven together or otherwise coupled to form the first lattice 400. The second lattice 402 also includes a plurality of fibers arranged in a plurality of directions, shown as two orthogonal directions, which are woven together or otherwise coupled to form the second lattice 402. The first lattice 400 and the second lattice 402 may be arranged relative to one another such that fibers of the first lattice 400 are parallel with fibers of the second lattice 402, or may be oriented differently so that fibers of the first lattice 400 are at non-orthogonal angles relative to fibers of the second lattice 402. In some embodiments, the first lattice 400 and the second lattice 402 appear substantially solid to the naked human eye, but are made up of fibers at a microscopic or smaller level.

The fibers of the first lattice 400 and the second lattice 402 may be made of carbon, for example such FIG. 5 shows a first lattice 400 of carbon fibers and a second lattice 402 of carbon fibers. In some embodiments, the fibers are made of graphite, for example such that some or all of the fibers of the first lattice 400 and the second lattice 402 are graphite fibers. The material of the fibers is preferably a high purity fibers (e.g., greater than 95% carbon) such that, when burned (in the presence of oxygen), the carbon fibers themselves leave little or no solid residue. When in vacuum (e.g., when inside the vacuum chamber 202 during operation of the apparatus 200, substantially outside the presence of oxygen) the carbon fibers are configured to handle high temperatures (e.g., greater than 200 C, greater than 300 C, greater than 800 C) without substantially deforming, melting, etc.

The first lattice 400 and the second lattice 402 are configured to capture ions incident thereon (e.g., ions from the ion beam provided by the ion beam generator 208 of FIG. 4). The arrangement of the plurality of fibers causes an ion to deflect (scatter, collide, etc.) off of multiple fibers as the kinetic energy of the ion is reduced until the ion will stay at the target 110 (e.g., reduce to thermal energy), without scattering away from the target 110 after a single collision. The arrangement of the fibers is partially porous, such that some ions are able to penetrate beyond an outer surface of the first lattice 400, thus reducing the amount of energy built up at the surface of the first lattice 400 and allowing ions to scatter multiple times without escaping the target 110 (e.g., vaporizing away from the target 110). Accordingly, relative to a flat plate or block of material, the lattice structure provides an increased surface area and overlapping geometry that can facilitate capture a high percentage of the ions incident on the target 110 (e.g., greater than 40%, greater than 90% in some arrangements). The first lattice 400 and the second lattice 402 thereby provide efficient collection of the desired isotope at the target 110.

The first lattice 400 and the second lattice 402 are also configured to burn (in the presence of oxygen) or otherwise react to leave (e.g., be reduced to) a residue that includes a high concentration of the desired isotope. For example, the fibrous lattice configuration of FIG. 5 provides the target 110 with an increased surface-area-to-mass ratio as compared to a solid block or plate of carbon or graphite, which enables relatively easy burning of the of the first lattice 400 and the second lattice 402 (e.g., as compared to a solid block of graphite, which typically will not burn). For example, during operation of the ion production system 100, the target 110 captures the desired isotope (in the first lattice 400 and the second lattice 402 in the example of FIG. 5) while the target 110 is held in vacuum without a substantial amount oxygen present (thereby preventing complete burning of the target 110). The target 110 can then be removed from vacuum (e.g., target 210 can be removed from the vacuum chamber 202 in the example of FIG. 4) for processing to extract the isotope from fibrous lattice. Outside vacuum, oxygen is present which allows burning of the carbon fibers. The fibrous lattice (e.g., the first lattice 400 and the second lattice 402) can then be burned to reduce the fibrous lattice to a residue having a high concentration of the desired isotope. The carbon dissipates as gas after burning, such that the remaining material is of the desired isotope, which may oxidize during the extraction process. For example, in some embodiments, a powder of oxidized ytterbium (e.g., oxidized ytterbium-176) is left as a powder (e.g., white-colored powered) after burning of the target.

Figure 6:
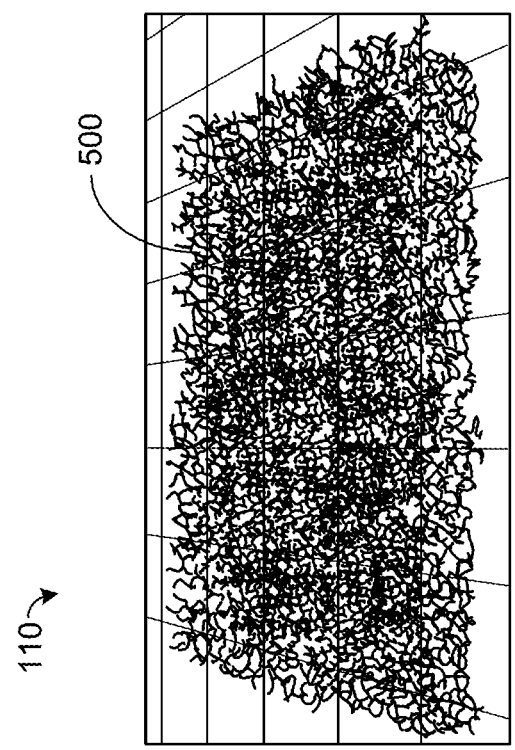
FIG. 6 is a perspective view of a fibrous lattice of a target of an ion production system, according to some embodiments.

Referring now to FIG. 6, a perspective view of a fibrous lattice 500 of the target 110 (or target 210) is shown, according to some embodiments. The fibrous lattice 500 can be used as an alternative to the first lattice 400 and the second lattice 402 of FIG. 5, or may be used in combination with the first lattice 400 and/or the second lattice 402 of FIG. 5 in various embodiments.

As shown in FIG. 6, the fibrous lattice 500 includes a plurality of fibers arranged in a tangled web, such that the fibrous lattice 500 may be characterized as an open-celled foam. As in the example of FIG. 5, the plurality of fibers may be carbon fibers and/or graphite fibers. The fibrous lattice 500 is configured to capture ions (e.g., from the ion beam generated by the ion beam generator 208 in the example of FIG. 2) such that the desired isotope is collected in the fibrous lattice 500. The fibrous structure of the fibrous lattice 500 may cause ions to deflect off multiple fibers before coming to rest in the fibrous lattice 500, without scattering away from the fibrous lattice 500 after a single collision. The fibrous lattice 500 also has a high surface-area-to-mass ratio which facilitates easy burning of the fibrous lattice 500 to reduce the fibrous lattice 500 to a residue having a high concentration of the desired isotope.

Figure 7:
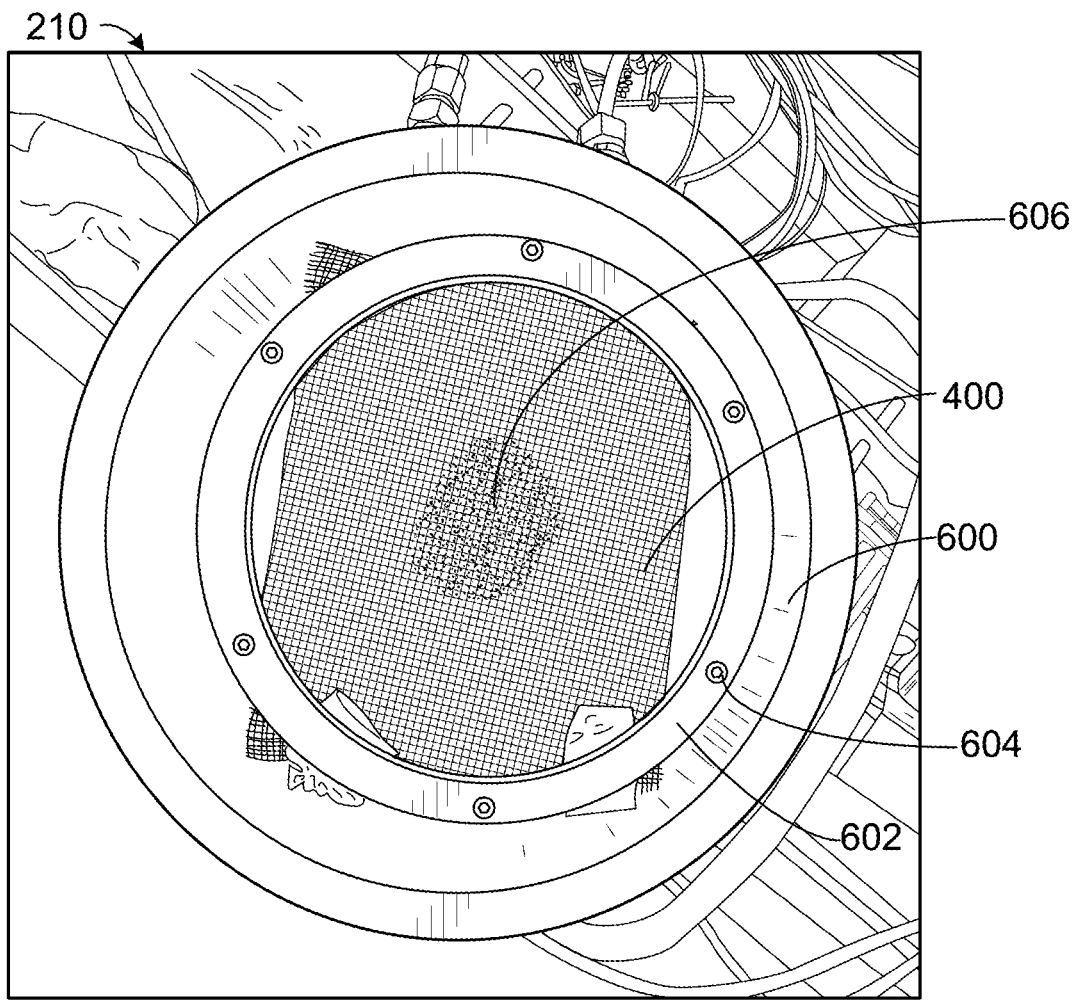
FIG. 7 is a top view of target of an ion production system, according to some embodiments.

Referring now to FIG. 7, a top view of the target 210 (or target 110) is shown, according to some embodiments. In the example shown, the target 210 is shown as including the first lattice 400 (the second lattice 402 may be included in some embodiments, e.g., obscured behind the first lattice 400 from the perspective of FIG. 7), a backing plate 600, a mount 602 formed as a ring and positioned such that the first lattice 400 is between the mount 602 and the backing plate 600, and bolts (or other coupling members, e.g., screws, clips, connectors, etc.) 604 coupling the mount 602 to the backing plate 600.

When the bolts 604 are tightened, the mount 602 holds the first lattice 400 (or other fibrous lattice, e.g., fibrous lattice 500) against the backing plate 600 such that the first lattice 400 is secured in position relative to the backing plate 600. The bolts 604 can be loosened to release the first lattice 400 from the mount 602 such that the first lattice 400 can be removed for harvesting of the collected isotope from the first lattice 400.

In some embodiments, the backing plate 600 is coupled to or part of the interior plate 212 of the magnetic rotation device 206 (actuator) of FIG. 4. In such embodiments, operation of the motor 216 to drive the exterior plate 214 causes rotation of the interior plate 212, the backing plate 600, the mount 602, and the fibrous lattice (e.g., the first lattice 400). The fibrous lattice is thereby rotatable about an axis, for example to increase a surface areas of the fibrous lattice (e.g., of the first lattice 400) on which the ion beam is incident.

FIG. 7 shows an example in which a beam of ytterbium ions with energies of 60 kV was generated and directed at the first lattice 400, causing the first lattice 400 to capture the ytterbium ions/atoms. FIG. 7 shows a burn area 606 within which the ytterbium was captured by the first lattice 400. In the example shown, the ion beam causes partial burning of the first lattice 400 during ion capture. FIG. 7 also illustrates that moving the first lattice 400 while the ion beam is incident on the first lattice 400 (e.g., by rotation as described above) can allow more of the first lattice 400 to be used to capture ions, thereby increasing total collection of desired isotopes/atoms.

Figure 8:
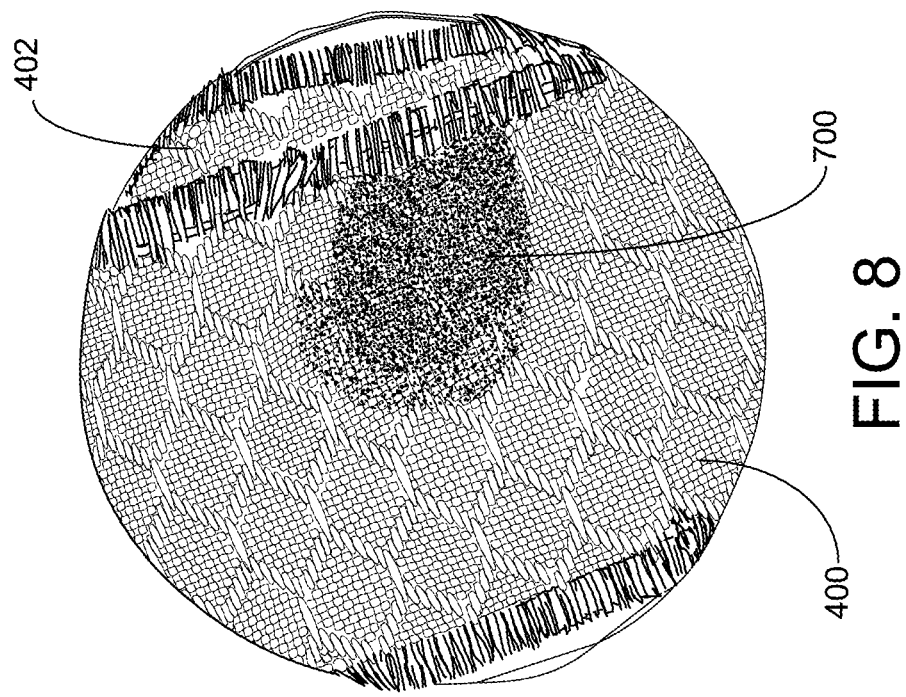
FIG. 8 is a top view of a fibrous lattice of a target of an ion production system, according to some experimental results.

Referring now to FIG. 8, a top of the first lattice 400 and the second lattice 402 (partially obscured by the first lattice 400) is shown, according to an experimental result. In the example of FIG. 8, an ion beam of ytterbium having energies of approximately 5 kV was provided incident on the first lattice 400 and the second lattice 402 (with some ions passing through the first lattice 400 to reach the second lattice 402). A burn area 700 shows where ions were collected in the first lattice 400 and the second lattice 402. The experiment of FIG. 8 shows that ytterbium can be captured by the first lattice 400 and the second lattice 402. FIG. 8 also illustrates that rotating the first lattice 400 and the second lattice 402 would expose more of the fibrous lattice material to the ion beam to increase the total collection of a desired isotope by the fibrous lattice.

Figure 9:
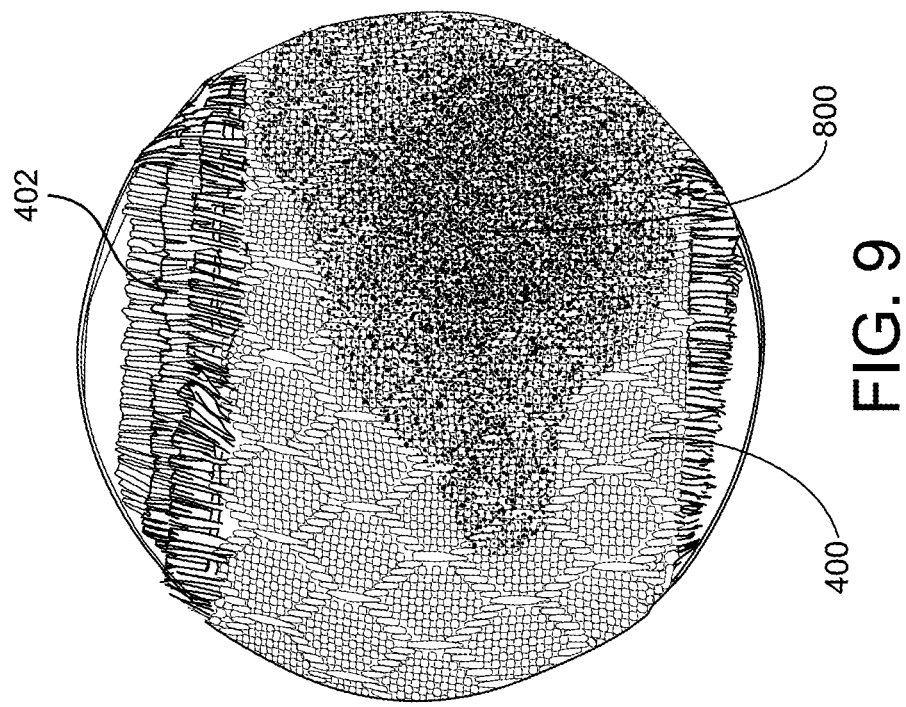
FIG. 9 is a top view of a fibrous lattice of a target of an ion production system, according to some experimental results.

Referring now to FIG. 9, a top of the first lattice 400 and the second lattice 402 (partially obscured by the first lattice 400) is shown, according to another experimental result. In the example of FIG. 9, an ion beam of ytterbium having energies of approximately 0.3 kV was provided incident on the first lattice 400 and the second lattice 402 (with some ions passing through the first lattice 400 to reach the second lattice 402). A burn area 800 shows where ions were collected in the first lattice 400 and the second lattice 402. Comparing the experiments of FIGS. 8-9, the beam having energies of approximately 0.3 kV provided increased capture than the beam of approximately 5 kV (as evidenced by the larger burn area 800 compared to the burn area 700). FIGS. 8-9 thereby illustrate the advantage of reducing ion energy before collision with the target 110 as described above with reference to FIGS. 1-3. FIG. 9 also illustrates that rotating the first lattice 400 and the second lattice 402 would expose more of the fibrous lattice material to the ion beam to increase the total collection of a desired isotope by the fibrous lattice. The various features described herein thereby contribute to highly-efficient capture of desired isotope(s)/atom(s) in a fibrous lattice material from which a residue rich in the desired particles can be easily obtained.

Although the discussion above gives a general overview of the principles of physics associated with operation of the ion production system 100, effects of the target voltage on the ion beam, etc., it should be appreciated that the behavior of ion beams is complex and that additional or alternative theories or experimental results may be used to provide further or alternative explanation of the various advantages of the systems and methods described herein. For example, experimental results have shown that providing the target 110 with a target voltage of the same polarity as the ion beam as described above provides the advantages described herein and that the fibrous lattice materials described herein provide for efficient capture of desired isotopes such as ytterbium-176.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method comprising:
   accelerating a plurality of ytterbium ions toward a lattice of carbon fibers; wherein at least a portion of the plurality of ytterbium ions is a plurality of ytterbium-176 ions;
   isolating the plurality of ytterbium-176 ions from the plurality of ytterbium ions; and
   capturing the plurality of ytterbium-176 ions in the lattice of carbon fibers.

2. The method of claim 1 further comprising burning the lattice of carbon fibers to obtain a residue comprising the plurality of ytterbium-176 ions.

3. The method of claim 1, wherein isolating the plurality of ytterbium-176 ions comprises
   applying a magnetic field to the plurality of ytterbium ions using a magnetic analyzer, thereby mass separating the plurality of ytterbium ions; and
   blocking a portion of the plurality of ytterbium ions using a mass-resolving aperture positioned between the magnetic analyzer and the lattice of carbon fibers, wherein the plurality of ytterbium-176 ions pass through the mass-resolving aperture.

4. The method of claim 1, wherein accelerating the plurality of ytterbium ions toward the lattice of carbon fibers comprises providing the plurality of ytterbium ions with energies greater than 100V.

5. The method of claim 1, wherein capturing the plurality of ytterbium-176 ions in the lattice of carbon fibers comprises decelerating the plurality of ytterbium-176 ions by deflecting the plurality of ytterbium-176 ions off of a plurality of the carbon fibers of lattice of carbon fibers.

6. The method of claim 1, further comprising increasing an area of the lattice of carbon fibers that captures the plurality of ytterbium-176 ions by operating an actuator to rotate or translate the lattice of carbon fibers.

7. The method of claim 1, wherein the lattice of carbon fibers comprises multiple layers of a fibrous carbon material.

8. The method of claim 1, wherein the lattice of carbon fibers comprises carbon fibers arranged in a plurality of directions.

9. The method of claim 1, wherein isolating the plurality of ytterbium-176 ions from the plurality of ytterbium ions comprises applying a magnetic field to the plurality of ytterbium ions using a magnetic analyzer, thereby mass separating the plurality of ytterbium ions.

10. The method of claim 1, wherein isolating the plurality of ytterbium-176 ions from the plurality of ytterbium ions comprises blocking a portion of the plurality of ytterbium ions using a mass-resolving aperture positioned between the magnetic analyzer and the lattice of carbon fibers, wherein the plurality of ytterbium-176 ions pass through the mass-resolving aperture.

11. The method of claim 1, wherein capturing the plurality of ytterbium-176 ions in the lattice of carbon fibers includes holding the lattice of carbon fibers at a target voltage.

12. The method of claim 11, further comprising reducing the target voltage to zero before disconnecting the lattice of carbon fibers from a voltage source.

13. The method of claim 1, further comprising removing the lattice of carbon fibers and replacing the lattice of carbon fibers with a new lattice of carbon fibers.

14. The method of claim 1, further comprising removing the plurality of ytterbium-176 ions from the lattice of carbon fibers; collecting the plurality of ytterbium-176 ions in a receptacle; and reusing the lattice of carbon fibers.

15. The method of claim 6, wherein operating the actuator to rotate or translate the lattice of carbon fibers further includes mechanically coupling the lattice of carbon fibers to an interior plate within a vacuum chamber and magnetically coupling the interior plate to an exterior plate outside of the vacuum chamber; wherein the actuator drives rotation or translation of the exterior plate, which magnetically transfers the rotation or translation to the interior plate.

16. The method of claim 15, further comprising cooling the exterior plate to increase the heat flow away from the lattice of carbon fibers.

17. The method of claim 15, further comprising heating the exterior plate to increase the heat flow to from the lattice of carbon fibers.

18. The method of claim 1, further comprising producing a plurality of ytterbium ions with an ion source.

19. The method of claim 18, wherein producing the plurality of ytterbium ions includes emitting electrons from a filament to ionize a ytterbium vapor.

\* \* \* \* \*

UNITED STATES PATENT AND TRADEMARK OFFICE
CERTIFICATE OF CORRECTION

Page 1 of 1

PATENT NO.         : 12,112,859 B2
APPLICATION NO.    : 17/957310
DATED              : October 8, 2024
INVENTOR(S)        : Sarko Cherekdjian and Rich Sisson It is certified that error appears in the above-identified patent and that said Letters Patent is hereby corrected as shown below:

In the Claims

Column 15, Claim 17, Line 20 reads:
the exterior plate to increase the heat flow to from the lattice
Whereas it should read:
the exterior plate to increase the heat flow to the lattice Signed and Sealed this
Twelfth Day of November, 2024

Katherine Kelly Vidal
*Director of the United States Patent and Trademark Office*